United States Patent [19]

Davis

[11] 4,017,165
[45] Apr. 12, 1977

[54] EYEGLASS FRAMES
[75] Inventor: James F. Davis, Muskogee, Okla.
[73] Assignee: Frank S. Griffin, Vian, Okla.; a part interest
[22] Filed: Sept. 22, 1975
[21] Appl. No.: 615,554
[52] U.S. Cl. .................. 351/153; 351/95; 351/120; 351/149
[51] Int. Cl.² .......................... G02B 5/30
[58] Field of Search ............ 351/149, 120, 95, 153

[56] References Cited
UNITED STATES PATENTS

| 1,252,126 | 1/1918 | Letzeisen | 351/120 |
| 2,694,341 | 11/1954 | Hansen | 351/120 |
| 3,189,912 | 7/1965 | Miller | 351/120 |
| 3,271,094 | 9/1966 | Wildermuth | 351/120 |
| 3,394,980 | 7/1968 | Dym | 351/149 |
| 3,801,189 | 4/1974 | Seraphin | 351/95 |
| 3,907,410 | 9/1975 | Richmond et al. | 351/120 |

FOREIGN PATENTS OR APPLICATIONS

| 363,625 | 5/1906 | France | 351/120 |
| 9,202 | 7/1885 | United Kingdom | 351/120 |

Primary Examiner—Harold A. Dixon
Attorney, Agent, or Firm—Head, Johnson & Chafin

[57] ABSTRACT

Eyeglass frame structure comprising a lens receiving or bow portion having a pair of oppositely disposed temple or earpiece members hingedly secured at the opposite ends thereof, said lens receiving portion being provided with a transversely separable nose bridge element for facilitating installing of a lens member in the eyeglass frame, each of said earpiece members being of an adjustable length, and each earpiece member hingedly secured to the lens receiving portion for adjustment of the planar orientation of the lens receiving portion with respect to the earpiece axis in both lateral and transverse directions.

8 Claims, 8 Drawing Figures

EYEGLASS FRAMES

BACKGROUND OF THE INVENTION

1. Field of the Invention

This invention relates to improvements in eyeglass frames and more particularly, but not by way of limitation, to eyeglass frames having adjustable earpieces hingedly secured to a lens receiving portion for adjustment in multiple directions with relation thereto, and a lens receiving portion having a separable bridge element for facilitating installing of the lenses in the frame.

2. Description of the Prior Art

The usual eyeglass frames available today include a pair of oppositely disposed earpieces hingedly secured to the opposite sides of a lens holding or receiving portion, said earpieces being movable between a position substantially perpendicular to the plane of the lens holding portion and an angular or collapsed position wherein the earpieces are disposed in closer relation to the lens holding portion. In the extended or perpendicular position of the earpieces, the earpieces span the wearer's head and engage the temple and ears of the wearer for supporting the eyeglasses in the proper useful position on the wearer's head. In the collapsed position of the earpieces, the eyeglasses may be more readily stored when not in use. In many instances, eyeglass frames must be constructed in a variety of sizes in order that the user thereof may select a frame structure which most nearly fits the size of his head for comfort and utility of wearing of the eyeglasses. In addition, many lens receiving portions of the eyeglass frame are of a unitary construction and the installation of lenses therein is somewhat tedious and difficult. Thus, the overall cost of the eyeglasses is increased.

In order to overcome these disadvantages, there have been some attempts at designing eyeglass frames with earpieces of an adjustable length, such as shown in the Jackson U.S. Pat. No. 2,443,249; and other eyeglass frames have been designed for facilitating the installation of the lenses, such as the Malcom U.S. Pat. No. 1,454,327. However, these devices have certain disadvantages in that the eyeglass frames frequently still do not fit the wearer thereof in a manner providing optimum comfort and protection for the eyes.

SUMMARY OF THE INVENTION

The present invention contemplates a novel eyeglass structure particularly designed and constructed for overcoming the disadvantages of present day eyeglass frames, and includes a bow member having a pair of temple or earpiece members hingedly secured at the opposite ends thereof, and having a split nose bridge portion for a partial separation of the frame to facilitate the insertion or removal of the lenses therefrom. Each temple or earpiece is of an adjustable length, and is provided with a unique hinge connection with the bow portion whereby the earpieces may be pivoted in the usual or normal manner between extended and contracted positions, and also pivoted in a direction substantially perpendicular with respect to the more normal pivot direction. In this manner, the planer orientation of the bow portion and/or lenses of the glasses may be adjusted with respect to the axis of the earpieces for a more proper orientation with the face of the wearer for assuring a comfortable and efficient use of the eyeglasses. The novel eyeglass frame is simple and efficient in operation and economical and durable in construction.

DESCRIPTION OF THE PREFERRED EMBODIMENT

Figure 1:
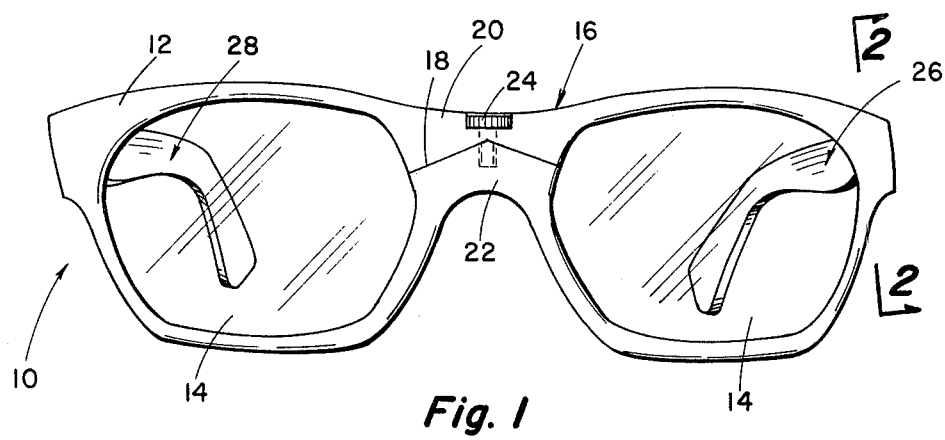
FIG. 1 is a front elevational view of a pair of eyeglasses having a frame structure embodying the invention.
Figure 6:
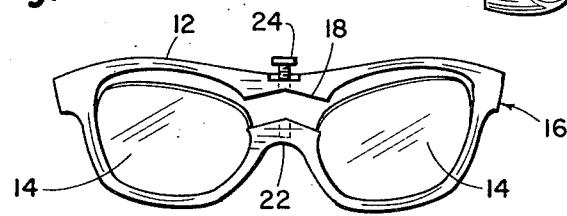
FIG. 6 is a front elevational view of a pair of eyeglasses having a frame structure embodying the invention and depicting the frame structure in a separated position for facilitating installation or removal of the lens members.
Figure 7:
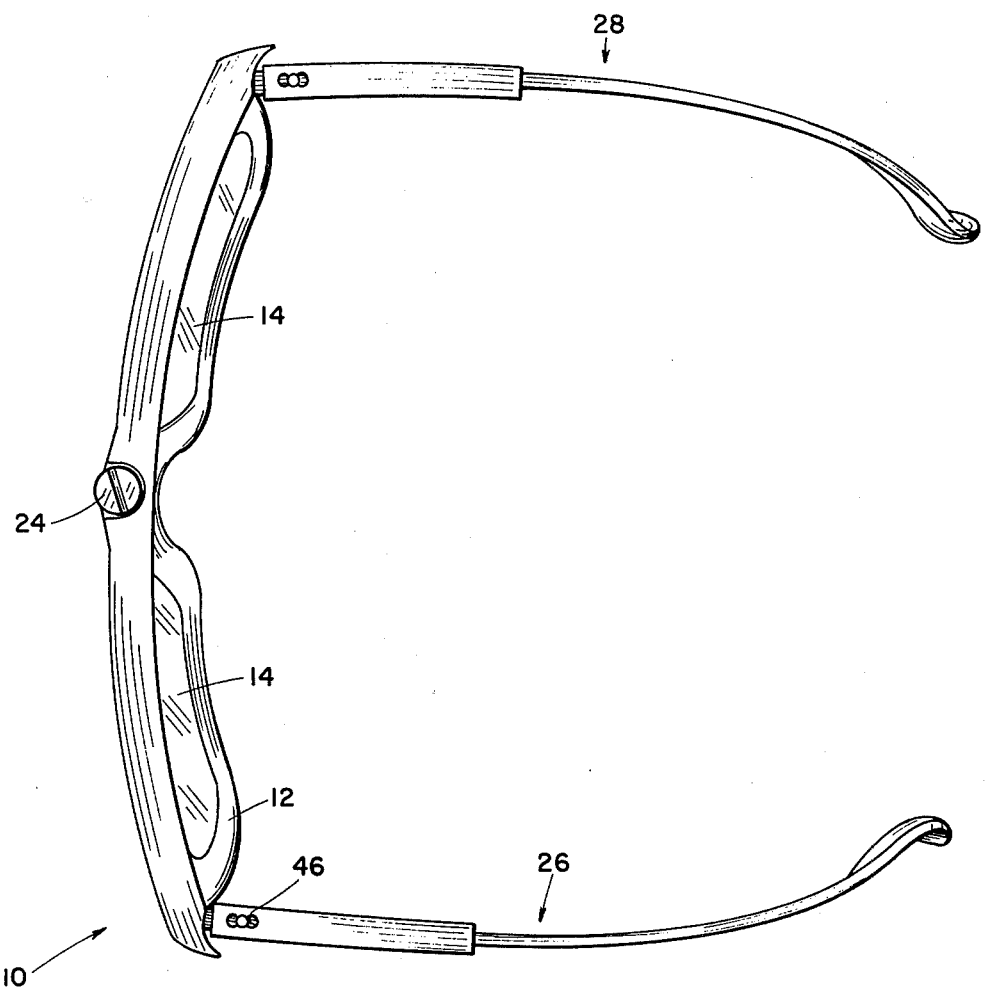
FIG. 7 is a top view of a pair of eyeglasses having a frame structure embodying the invention.
Figure 8:
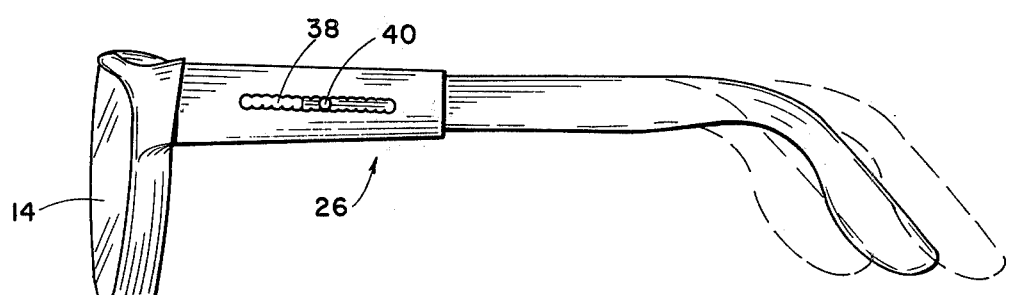
FIG. 8 is a side elevational view of a pair of eyeglasses having a frame structure embodying the invention, and depicting a plurality of lengths for the earpiece illustrated in broken lines.

Referring to the drawings in detail, reference character 10 generally indicates an eyeglass frame preferably constructed of a suitable plastic material, but not limited thereto, and comprising a bow or lens receiving portion 12 having a pair of lenses 14 mounted therein as is well known. Although the bow 12 will be referred to herein as being substantially planar, it is to be noted that the transverse and longitudinal dimensions thereof are preferably slightly arcuate, as particularly shown in FIGS. 7 and 8. The bow 12 is provided with a nose bridge portion 16 substantially centrally disposed between the lenses 14. The bridge 16 is cut or split along a substantially inverted V-shaped line 18 whereby the bridge 16 is separated into an upper section 20 and a lower section 22 as viewed in the drawings. The upper portion 20 is provided with a threaded bore (not shown) extending from the upper surface thereof into communication with the line 18 and in substantial alignment with a complementary threaded bore (not shown) provided in the lower portion 22 for receiving a threaded stud 24 therein. When the sections 20 and 22 are to be positioned in abutment as shown in FIG. 1, the screw or stud 24 may be threaded into the complementary bores. When the portions 20 and 22 are to be separated as shown in FIG. 6, the screw 24 may be "backed off" or removed from the threaded connection with the bores and the portions 20 and 22 may be manually separated for providing access to the lenses 14, thus facilitating insertion or removal of the lenses 14. It will be apparent that the inherent flexible characteristics of the plastic material from which the frame is constructed facilitates the separation of the bridge sections 20 and 22, and the memory characteristic of the plastic material causes the sections 20 and 22 to move into abutment upon the release of manual pressure.

Figure 3:
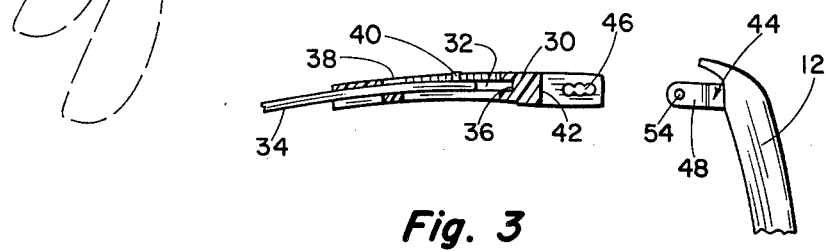
FIG. 3 is a separated elevational view, partly in section, of the novel hinge arrangement between the earpiece and bow section of an eyeglass frame embodying the invention.
Figure 4:
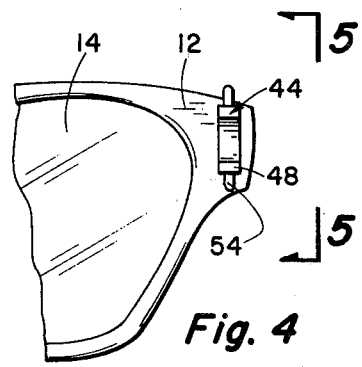
FIG. 4 is a front elevational view of a portion of the bow member showing one element of the hinge portion of a frame structure embodying the invention.
Figure 5:
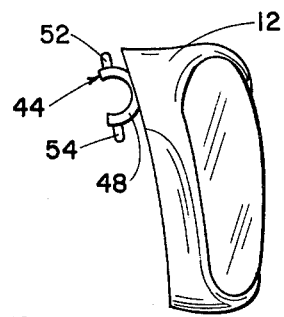
FIG. 5 is a view taken on line 5—5 of FIG. 4.

A pair of oppositely disposed earpieces 26 and 28 are hingedly secured to the opposite ends of the bow 12 in a manner as will be hereinafter set forth. Since the earpieces 26 and 28 are substantially identical, the structure of only the earpiece 26 will be set forth in detail herein. The earpiece 26 comprises a temple element 30 having a centrally disposed recess 32 (FIG. 3) for slidably receiving one end of an ear engaging element 34 therein. The recess 32 is closed at one end 36 for limiting the movement of the ear engaging element 34 in one direction, and open at the opposite end thereof for receiving the element 34 therethrough. An elongated slot 38 is provided along one side of the temple element 30 and is in open communication with the internal or central recess 32. The opposite sides of the slot 38 are serrated, with each individual serration being substantially circular in configuration complementary to the outer periphery of an outwardly extending pin member 40 provided on the ear engaging element 34. As the ear engaging element is moved longitudinally within the recess 32, the pin 40 rides in the slot 38, with the pin engaging the serrations of the sides of the slot 38. Manual pressure utilized for movement of the ear engaging piece is sufficient for moving the ear engaging piece with respect to the temple element 30, but when the manual pressure is released, the pin 40 will engage the adjacent serrations of the slot 38 for securely retaining the ear engaging element 34 in the desired or preselected position with respect to the temple element 30, thus providing for an adjustable length for the earpiece 26. It is to be noted that the flexible or yieldable characteristic of the plastic material from which the frame is constructed facilitates the assembly of the ear engaging element 34 with the temple element 30.

Figure 2:
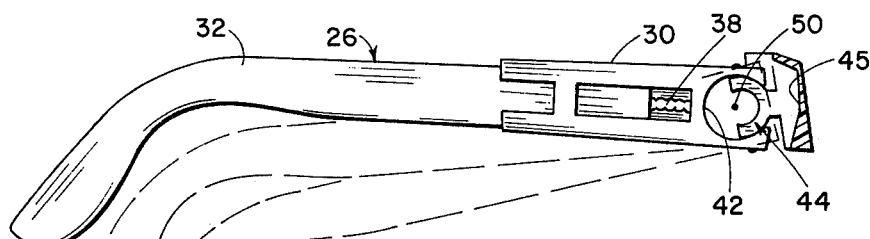
FIG. 2 is a sectional view taken on line 2—2 of FIG. 1.

The inwardly directed surface of the temple element 30 is provided with a recess 42 (FIG. 2) of circular configuration for receiving a hinge element 44 therein. In addition, the opposite edges of the temple element 30 are provided with aligned elongated slots 46, each having the opposite edges thereof serrated similar to the slot 38, for a purpose as will be hereinafter set forth.

One of the hinge elements 44 is provided in a recess 45 on the inwardly directed surface at each end of the bow portion 12. The hinge element 44 is a yoke member extending substantially perpendicularly from the bow 12. The arms 48 of the yoke are of a substantially circular outer configuration complementary to the configuration of the recess 42 and lie in a plane substantially perpendicular to the plane of the bow 12, and disposed along the transverse direction thereof. In this manner, the temple element 30 is pivotally secured to the bow 12 for rotation about the longitudinal axis of the recess 42 as represented by the point 50 in FIG. 2. A pair of oppositely disposed aligned pins 52 and 54 are provided on the arms 48 and extend outwardly therefrom for engagement with the oppositely disposed slots 46 of the temple element 30. When manual pressure is applied to the bow 12 independently of the earpiece 26 the pins 52 and 54 may be moved within the respective slots 46 for adjusting the planar orientation of the bow 12 with respect to the earpiece as indicated in broken lines in FIG. 2. When the manual pressure is removed, the pins 52 and 54 will securely engage the adjacent serrations for retaining or locking the earpiece in the selected position with respect to the bow 12.

In addition, the pins 52 and 54 are pivotally disposed within the slots 46 for pivoting about their own longitudinal axes. In this manner, the earpiece 26 may be pivoted with respect to the bow 12 in directions toward the plane of the bow and away from the plane of the bow to provide the usual or normal extended and contracted positions for the earpieces with respect to the bow member 12.

In use, the lenses 14 may be readily installed or removed from the bow member 12 by removing or backing off the screw 24 whereby the bridge elements 20 and 22 may be separated as shown in FIG. 6. The inherent flexibility of the plastic material facilitates the manual separation of the bridge elements 20 and 22, as hereinbefore set forth, and the arcuate configuration of the bow 12 in both the lateral and transverse directions facilitates the access to the lens areas when the elements 20 and 22 are separated. When the selected or desired lenses 14 have been installed in the bow 12, the elements 20 and 22 may be returned to the normal abutment position therebetween as shown in FIG. 1 and the screw 24 may be threadedly engaged with the aligned bores (not shown) in order to securely clamp the lenses 14 within the bow 12.

Of course, the earpieces 26 and 28 may be easily pivoted to the normal extended positions thereof for facilitating positioning of the eyeglasses on the head of the wearer, and the length of the earpieces may be readily adjusted by moving the ear engaging element 34 with respect to the temple element 30 as hereinbefore set forth. Alternately, the earpieces 26 and 28 may be pivoted to the normal contracted position therefor in order to facilitate the storage of the eyeglasses when not in use.

When the eyeglasses are in position on the head of the wearer, the planar position of the bow 12 and lenses 14 may be adjusted or orientated with respect to the face of the wearer to assure a comfortable positioning of the glasses. In order to accomplish this, the wearer may grasp the bow 12 and pivot the bow about the axis 50 until the desired position is achieved. Alternately, of course, the earpieces 26 and 28 may be grasped for rotation about the axis 50 in order to individually adjust the relationship of the earpieces with respect to the planar orientation of the bow 12 and lenses 14.

From the foregoing it will be apparent that the present invention provides a novel eyeglass frame structure wherein the installation and removal of the lenses is greatly facilitated, the lengthening and/or shortening of the earpieces may be readily accomplished, and the planar orientation of the bow and lenses with respsect to the face of the wearer may be adjusted as desired for assuring a comfortable fit for the eyeglasses.

Whereas the present invention has been described in particular relation to the drawings attached hereto, it should be understood that other and further modifications, apart from those shown or suggested herein may be made within the spirit and scope of this invention.

What is claimed is:

1. An eyeglass frame comprising a bow portion, earpiece members pivotally secured to each end of the bow portion and movable to alternate extended and contracted positions, and hinge means comprising substantially ball and socket shaped elements interposed between the bow portion and earpiece members providing said pivotal movement and securing the earpiece members to the bow portion for rotation about an axis substantially parallel with the longitudinal dimension of the bow portion, said substantially socket shaped element having elongated slot means provided therein, and outwardly extending pin means provided on said substantially ball shaped element for extending through said slot means for providing both the rotation of said bow portion and the movement of said earpiece members.

2. An eyeglass frame as set forth in claim 1 wherein the hinge means comprises substantially ball shaped yoke means secured to the bow portion, substantially socket shaped recess means provided on said earpiece members for receiving the yoke means therein, said yoke and recess means providing said rotation of the earpiece members about an axis parallel with the longitudinal dimension of the bow portion, and said elongated slot and pin means cooperate for providing pivoting of the earpiece members between said extended and contracted positions.

3. An eyeglass frame as set forth in claim 1 and including a nose bridge portion for the bow portion having at least two separable elements for facilitating installation of lens members in the bow portion.

4. An eyeglass frame as set forth in claim 3 wherein said nose bridge portion is slit to provide said separable elements, and threaded means cooperates between the separable elements for removable connection therebetween.

5. An eyeglass frame as set forth in claim 1 wherein said earpiece members are of an adjustable length.

6. An eyeglass frame as set forth in claim 5 wherein said adjustable length earpiece members each comprise an ear engaging element, a temple portion hingedly secured to the bow portion and having a centrally disposed recess for receiving one end of said ear engaging element therein, and said elongated slot and pin means cooperate between the temple portion and ear engaging element for locking the ear engaging element to the temple portion in substantially any desired preselected relative longitudinal position therebetween.

7. An eyeglass frame as set forth in claim 6 wherein said socket shaped element is provided on said temple portion and the opposite edges of said elongated slot are serrated, and said substantially ball shaped element is on said ear engaging element and the pin means extending outwardly therefrom engages the serrations of the slot to provide said locking engagement between the ear engaging element and temple portion.

8. An eyeglass frame comprising a bow portion, earpiece members pivotally secured to each end of the bow portion and movable to alternate extended and contracted positions ball and socket hinge means interposed between the bow portion and earpiece members including slot and pin means providing said pivotal movement of said ear piece members and also securing the earpiece members to the bow portion for rotation of the bow portion about an axis substantially parallel with the longitudinal dimension of the bow portion, a nose bridge portion provided for the bow portion and separable into at least two elements for facilitating installation of lens members in the bow portion, and said earpiece members being provided with adjustment means for adjustment of the length thereof.

* * * * *